United States Patent [19]
Todd

[11] Patent Number: 6,164,579
[45] Date of Patent: Dec. 26, 2000

[54] METHOD FOR FLOATING TAPE SPOOLS IN FIXED CENTER DRIVES

[75] Inventor: Christian Allen Todd, Thornton, Colo.

[73] Assignee: Storage Technology Corporation, Louisville, Colo.

[21] Appl. No.: 09/307,161

[22] Filed: May 7, 1999

[51] Int. Cl.[7] .................................................. G03B 23/087
[52] U.S. Cl. ........................................................... 242/342
[58] Field of Search ................................ 242/342, 343.2, 242/345, 345.2

[56] References Cited

U.S. PATENT DOCUMENTS

| | | | |
|---|---|---|---|
| 3,697,014 | 10/1972 | Lowry et al. . | |
| 3,871,755 | 3/1975 | Wright . | |
| 3,941,333 | 3/1976 | Carpenter et al. | 242/345 X |
| 4,318,603 | 3/1982 | Daitoku et al. | 242/342 X |
| 4,416,432 | 11/1983 | Komatsubara et al. | 242/343.2 X |
| 5,027,249 | 6/1991 | Johnson et al. | 242/345.2 |
| 5,871,166 | 2/1999 | Doninellie | 242/342 X |
| 5,893,527 | 4/1999 | Mizutani et al. | 242/345.2 X |
| 5,992,782 | 11/1999 | Goodknight | 242/342 X |

*Primary Examiner*—Donald P. Walsh
*Assistant Examiner*—Collin A. Webb
*Attorney, Agent, or Firm*—Brooks & Kushman P.C.

[57] ABSTRACT

A tape cartridge, a cartridge-drive system, and a method of operation for aligning spools inside the tape cartridge with fixed center drives. The spools are allowed to slide relative to a baseplate allowing them to move in a direction normal to their axis of rotation to account for axial misalignment with the fixed center drives. Posts maintain the spools in close proximity to the baseplate. The fixed center drives have a flexible joint to account for angular misalignments of the spool and drive axes, and to account for spool-to-drive distance variations along the axis of rotation. Each spool and drive have a ring of triangular shaped teeth that self-align when engaged. Thrust bearings may be disposed between the spools and the baseplate to minimize friction. Each spool may include a normally engaged locking clutch mechanism to reduce the possibility of tape spillage during handling. The clutch is disengaged by engagement with an annular boss on the drive.

18 Claims, 4 Drawing Sheets

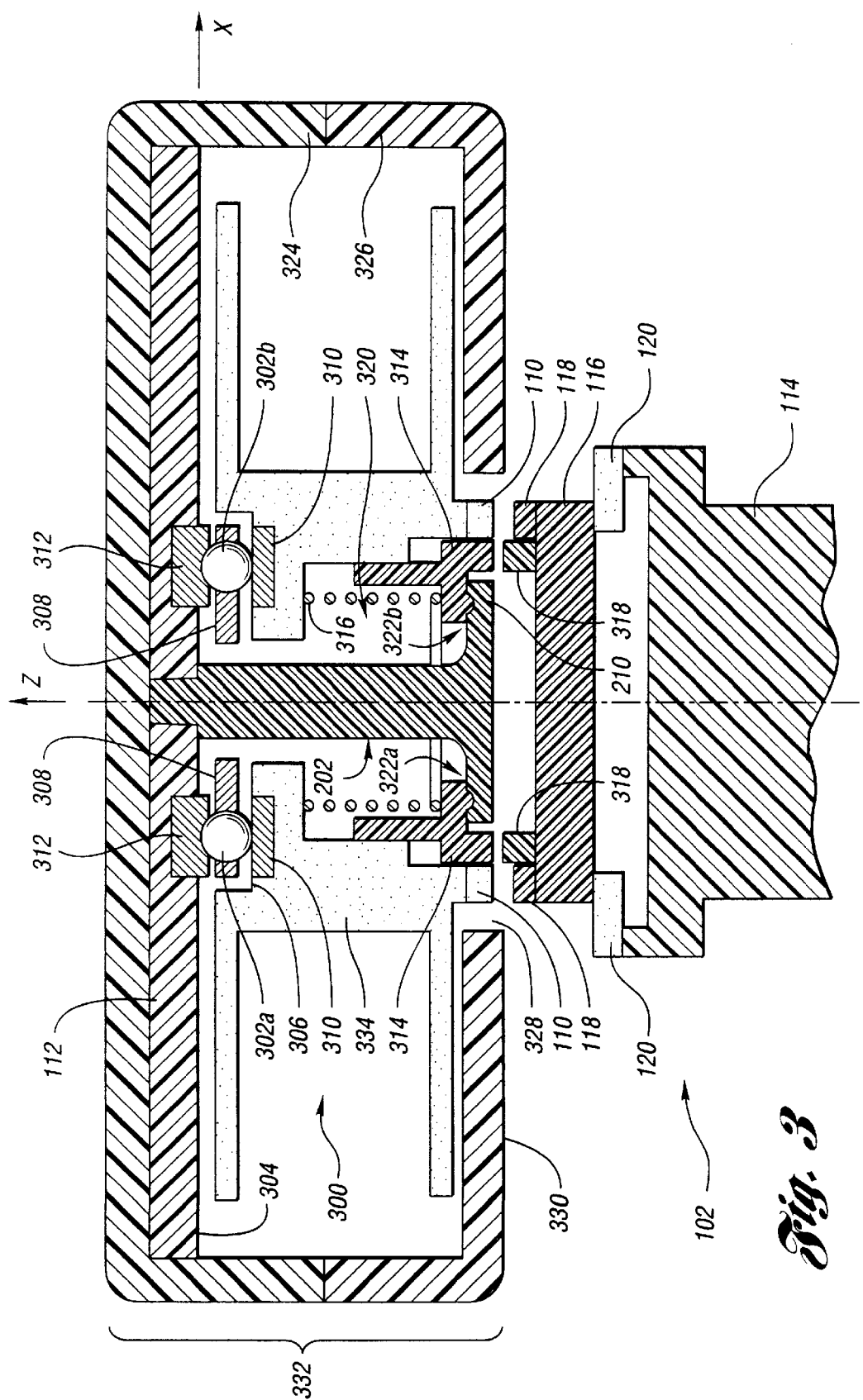

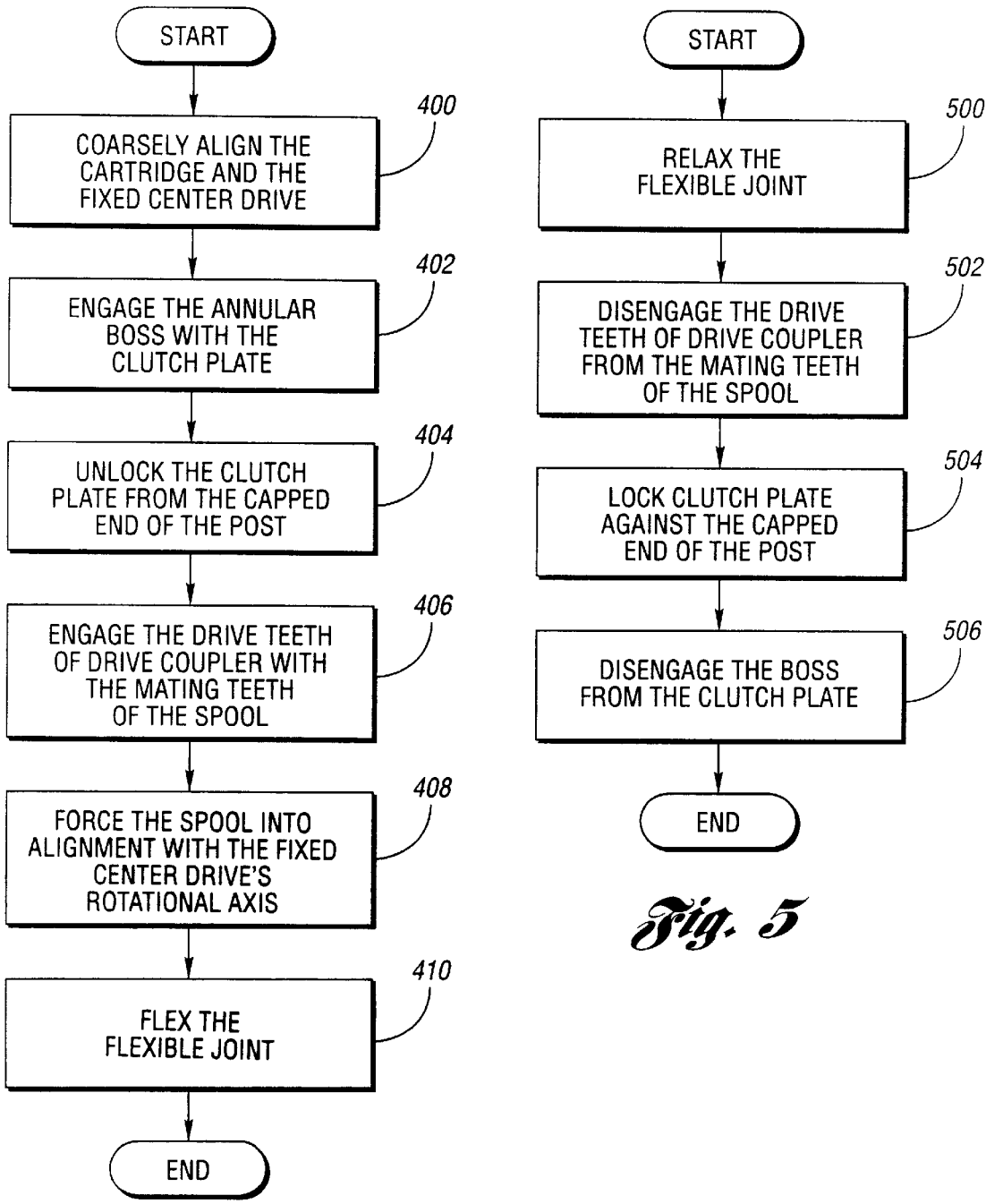

METHOD FOR FLOATING TAPE SPOOLS IN FIXED CENTER DRIVES

TECHNICAL FIELD

The present invention relates to the field of tape cartridges having floating spools for use with fixed center drives.

BACKGROUND ART

The spools of a high speed magnetic tape cartridge can rotate at speeds of up to four thousand revolutions per minute. At these rotational speeds any misalignment between the spool and the drive that it is coupled with can result in unacceptable wobbles between the two. Various approaches and mechanisms have been used to compensate for, or eliminate axial misalignment. Since the number of tape cartridges produces exceeds the number of drives by several orders of magnitude, the burden of compensating for axial misalignment has fallen on the drives. A common drive design inserts a complex drive coupling between a fixed axis drive mechanism and the spool. This drive coupling can move parallel to the axis of rotation of the fixed axis drive mechanism, move linearly in any direction in a plane normal to the axis of rotation, and still transfer torque to the spool. When in use, the spool end axis of the drive coupler will orbit the drive mechanism end axis of the drive coupler once or each revolution of the drive mechanism. The greater the axial misalignment between the drive mechanism and the spool, the greater the orbital radius through which the drive coupler must flex. When operated at thousands of revolutions per minute over tens of thousands of hours, the drive couplers are subject to significant wear.

Mechanical tolerances in tape cartridge manufacturing and spool repositioning due to mishandling, such as dropping the cartridges, sometimes cause each spool's axis of rotation to be misaligned with the respective drive mechanism's axis of rotation. Compensation for any such misalignments is usually allocated to the drive coupler. The drive coupler tilts away from the drive mechanism's axis of rotation to align with the spool's axis of rotation. As the drive mechanism rotates through one revolution, the drive coupler tilt precesses through one circle resulting in more wear.

Another desirable feature commonly included in the tape cartridges is a clutch mechanism that locks the spools while the tape cartridge is not in use. The clutch mechanism keeps the tape wound around the spools from spilling off the spools while the tape cartridge is being handled. When the tape cartridge engages the drive coupler, the clutch unlocks to allow the spools to be turned by the drive mechanism. Common designs lock the spools against the housing of the cartridge. Such designs require the cartridges to have sufficient strength and alignment accuracy with respect to the spools to operate as half of the clutch mechanism.

DISCLOSURE OF INVENTION

The present invention is a tape cartridge, a cartridge-drive system, and a method of operation for aligning spools inside the tape cartridge with fixed center drives. Alignment in the x-y plane normal to the drive's z axis of rotation is accomplished within the tape cartridge. Each spool in the tape cartridge is mounted to a common baseplate. The mounting allows the spools to rotate, and allows for limited linear movement in the x-y plane for alignment purposes. Alignment in the z axis is provided by a flexible joint formed between the drive mechanism and drive coupler. The flexible joints bias the drive couplers against the spools and account for axial misalignment between the driver mechanisms and spools. This approach eliminates a need for the drive or the tape cartridge to accommodate for misalignments in all axises by itself, making the design of both simpler and more reliable.

In operation, the engaging forces between drive teeth on the drive couplers and mating teeth on the spools cause the spools to move in the x-y plane to align each spool's axis of rotation with the respective drive coupler's axis of rotation. Any misalignment in the z axis direction or angular misalignment between each spool's axis of rotation and the respective drive mechanism's axis of rotation is accounted for by the flexible joint between each drive coupler and drive mechanism.

A thrust bearing may be provided between each spool and the baseplate for low friction operation. At least one race of each thrust bearing must have a flat surface (no annular grooves) to allow for x-y movement of the spool.

A clutch member may be provided for each spool in the tape cartridge to prevent the spools from rotating during normal handling. Bosses on the drive couplers engage/disengage the clutch members to unlock/lock the spools as the bias between the drive couplers and spools is applied/released.

Accordingly, it is an object of the present invention to provide tape cartridge having one or more spools mounted on a baseplate. The mounting is provided by a post running through an axial bore in each spool. The outer diameter of each post is smaller than the internal diameter of each spool so that the spool has limited movement across the planar surface of the baseplate. Each post has a capped end that maintains the spool close to the baseplate. A set of mating teeth are provided on each spool for engaging a set of drive teeth on a drive coupler that is external to the tape cartridge.

Another object of the present invention is to provide a cartridge-drive system that incorporates the tape cartridge described above. The system includes one or more drive mechanisms for turning the spools. Each drive mechanism is coupled to the respective spool by a drive coupler. A flexible joint between each drive mechanism and respective drive coupler allow the drive coupler to move parallel to the drive mechanism's axis of rotation and tilt out of the drive mechanism's axis of rotation while transferring torque. The flexible joint also biases the respective drive coupler against the respective spool. Each drive coupler has a set of drive teeth to engage a mating teeth of the respective spool.

Yet another object is to provide a method of operation for the system described above. As each drive coupler and spool is initially biased together, a clutch on the spool unlocks freeing the spool for rotation with the drive coupler and for movement in the x-y plane. Further biasing forces the spool to move in the x-y plane in a direction toward the drive coupler's axis of rotation. When the bias is removed, the spool is locked to prevent unwanted rotation or x-y movement.

These and other objects, features and advantages will be readily apparent upon consideration of the following detailed description in conjunction with the accompanying drawings.

BRIEF DESCRIPTION OF DRAWINGS

FIG. 3 is the cross-sectional view of the preferred embodiment of the tape cartridge with the drive coupler disengaged from the spool;

FIG. 4 is a flow diagram of the process for engaging the spool to the drive coupler; and FIG. 5 is a flow diagram of the process for disengaging the spool from the drive coupler.

BEST MODE FOR CARRYING OUT THE INVENTION

Figure 1:
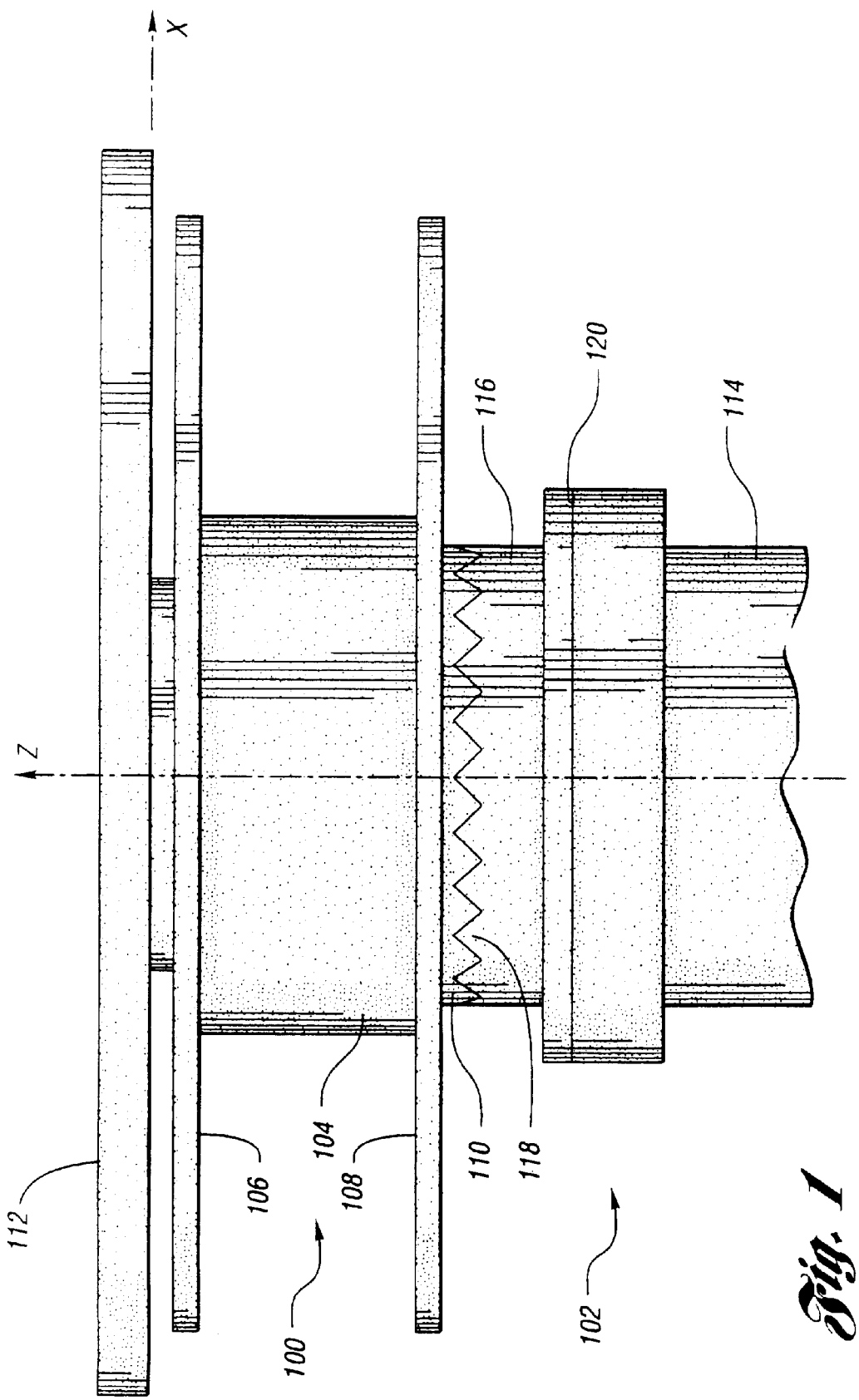
FIG. 1 is a side view of a baseplate and one spool of a tape cartridge engaged with a drive coupler and drive mechanism.

FIG. 1 is a side view of one spool 100 engaged with one fixed center drive 102. The fixed center drive 102 has an axis of rotation that is also referred to as a z axis for the sake of discussion. Also, for the sake of discussion, an x-y plane is defined at the end of the spool 100 opposite the fixed center drive 102. (The y axis points out of the page and thus is not represented by an arrow in the figure.) Spool 100 has three main sections, the body 104, two flanges 106–108, and mating teeth 110. Each of these sections may be fabricated separately and assembled, or fabricated from a single piece of material. Spool 100 is mounted for rotation adjacent to baseplate 112. The mounting allows the spool 100 to rotate, and it allows for limited linear movement in the x-y plane.

Drive 102 has four main components, a drive mechanism 114, a drive coupler 116, drive teeth 118 and a flexible joint 120. The drive mechanism 114 provides a torque about the z axis that ultimately spins spool 100. Drive coupler 116 interfaces to the spool 100 with the drive teeth 118. Drive coupler 116 is linked to the drive mechanism 114 by the flexible joint 120. The flexible joint 120 allows transfer of rotational torque while allowing the drive coupler 116 to move parallel to the z axis direction relative to the drive mechanism 114 and account for any angular misalignment between the axes of rotation of the spool 100 and drive mechanism 114. The flexible joint 120 is formed by an elastic ring, bellows, or a resilient member that connects the drive coupler 116 to the drive mechanism 114. Bellows are used in the preferred embodiment since they do not allow for any rotational backlash. Any functionally equivalent design that allows torque transfer, movement parallel to the z axis and tilting away from the z axis may be used. In application where the tilting away from the z axis is not required, a linear sliding joint may be used in place of the flexible joint 120. The linear sliding joint is formed by keying or splining drive mechanism 114 and drive coupler 116, or by providing other design features that allow sliding motion parallel to the z axis and torque transfer. A spring or other resilient member disposed between the drive mechanism 114 and drive coupler 116 is included in the linear sliding joint to bias the drive coupler 116 towards the spool 100.

The drive teeth 118 at the end of the drive coupler 116 engage the mating teeth 110 of the spool 100. Both the mating teeth 110 and drive teeth 118 are triangular shaped so that they are self-aligning when engaged. In the preferred embodiment, the mating teeth 110 and drive teeth 118 are in the form of continuous circles of teeth around the respective axis of rotation. Other variations on the mating teeth 110 and drive teeth 118 may be used. As an example, the mating teeth 110 may be formed as multiple arc segments of teeth evenly spaced around the axis of rotation of the spool 100. Other shapes of each tooth may also be used such as a saw-tooth and a sine wave. What is required is that when the mating teeth 110 of spool 100 engage the drive teeth 118 of the drive coupler 116, they self-align to be centered on the same axis of rotation.

Figure 2:
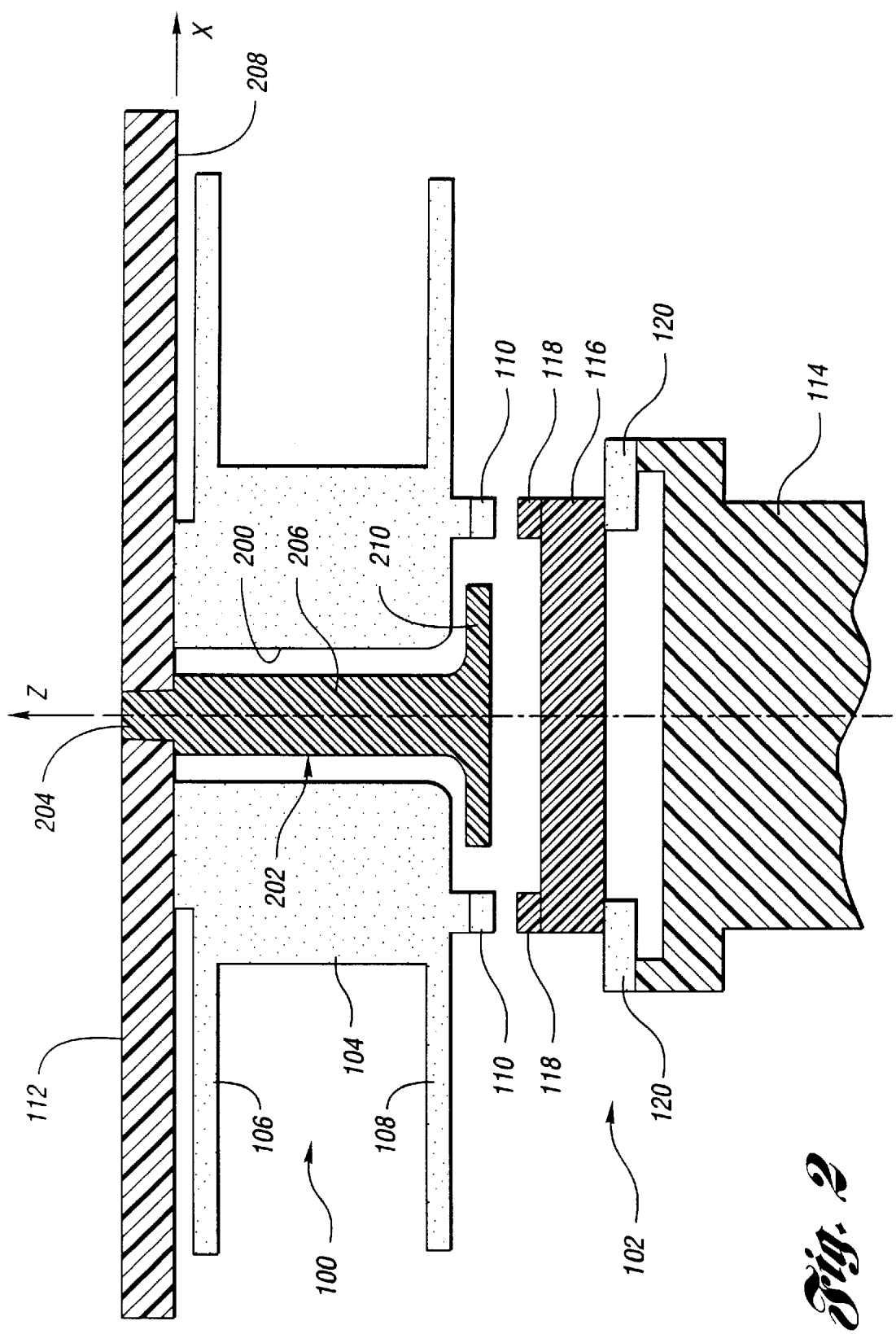
FIG. 2 is a cross-sectional view of the FIG. 1 taken at the axis of rotation with the drive coupler disengaged from the spool.

FIG. 2 is a cross-sectional view of FIG. 1 with the spool 100 and fixed center drive 102 disengaged. In this view, the axial bore 200 in spool 100, and post 202 are visible. Post 202 has a mounting end 204 that is attached to the baseplate 112 so that the body 206 of the post 202 is approximately normal to the surface 208 of baseplate 112. One advantage of this design over a fixed spool center design is that the orientation of the post 202 with respect to the baseplate 112 is not critical. The axis of rotation of spool 100 is not determined by the post 202. Therefore, any angular misalignment of the post 202 to the baseplate 112 will not result in an angular misalignment of the axis of rotation of spool 100 with the axis of rotation (the z axis) of the fixed center drive 102. Angular misalignment of post 202 with respect to the baseplate 112 may be introduced due to manufacturing tolerances or mishandling after assembly., such as dropping the cartridge on the floor.

The outer diameter of the body 206 of the post 202 is less than the internal diameter of the axial bore 200 to allow the spool limited movement in the x-y plane for alignment purposes. Post 202 also has a capped end 210 that extends radially to cover the axial bore 200. Capped end 210 keeps the spool 100 in close proximity to baseplate 112 when the spool 100 is not engaged with the fixed center drive 102. Capped end 210 may be formed as a separate component and mounted to the body 206, or formed as an integral part of the post 202.

FIG. 3 is a cut-away view of the preferred embodiment of the cartridge. In this embodiment, the spool 300 does not rest directly on the baseplate 112. Instead, a thrust bearing is disposed between this spool 300 and the baseplate 112. At a minimum, the thrust bearing is a set of ball bearings 302a–b captured between the spool 300 and baseplate 112. This approach requires that the spool 300 and baseplate 112 are sufficiently hardened to withstand the pressures of the ball bearings 302a–b. Ball bearings 302a–b allow the spool 300 to rotate about the z axis and to move in the x-y plane with little friction. To allow for the x-y plane movement, either one or both of surfaces 304 and 306 must be planar and parallel to the x-y plane. An annular groove may be formed in either the surface 304 of baseplate 112 or the surface 306 of spool 300 to contain the race of the ball bearings 302a–b in a circular pattern around post 202. A cage 308 may also be used to hold the ball bearings 302a–b in the circular pattern to simplify fabrication.

Choices of materials for spool 300 and baseplate 112 may be optimized for purposed of weight, cost, magnetic properties, and other desirable characteristics. As a result, it is possible that spool 300 and/or baseplate 112 may not be well suited for direct contact with the ball bearings 302a–b. Surface 304 and surface 306 may be too soft or too rough to achieve the desired bearing characteristics. In such situations, a first bearing race 310 may be provided in spool 300 and/or a second bearing race 312 may be provided in the baseplate 112. As shown in FIG. 3, the second bearing race 312 has an annular groove while the first bearing race 310 presents a planar surface to the ball bearings 302a–b. This situation may be reversed with the groove in the first bearing race 310 and a planar surface on the second bearing race 312. In yet another variation, both the first bearing race 310 and second bearing race 312 may have planar surfaces while the cage 308 maintains the ball bearings 302a–b in the desired position about post 202.

The preferred embodiment includes a normally engaged locking clutch mechanism that prevents spool 300 from rotating and moving in the x-y plane when not engaged to the fixed center drive 102. The locking clutch mechanism comprises three parts, a clutch member 314, a resilient member 316, and an annular boss 318. Clutch member 314 is mounted in a coaxial cavity 320 within spool 300. The mounting is a linear sliding joint that allows clutch member 314 to move parallel to the z axis with transferring torque between the clutch member 314 and spool 300.

Resilient member 316 is a coil spring, elastic material, or the like, that biases the clutch member 314 against the capped end 210 of post 202. Clutch member 314 and the capped end 210 of post 202 may include one or more locking teeth 322a–b that align and hold spool 300 in a fixed position when the locking clutch mechanism is engaged. In another embodiment, clutch member 314 and capped end 210 of post 202 are designed so that the friction between the two is sufficient to prevent spool 300 from rotating or moving in the x-y plane during handling.

The advantage of this design over existing designs is that the locking clutch mechanism operates independently of a housing. This means that the bearings 320a–b, the first bearing race 310 and the second bearing race 312 remain pre-loaded and spool 100 locked while the baseplate 112 and spool 100 are out of the housing during assembly or repair. Also, there are no critical alignments necessary between the housing and clutch member 314. Finally, there are no forces exerted on the housing by the locking clutch mechanism.

Annular boss 318 is operative to unlock the clutch member 314 from the capped end 210 of post 202 while the spool 300 is engaged with the fixed center drive 102. Annular boss 318 and clutch member 314 are designed so that they engage each other and release the locking teeth 322a–b before the mating teeth 110 and drive teeth 118 engage. This approach prevents the mating teeth 110 and drive teeth 118 from grinding against each other in an effort to self-align while the locking teeth 322a–b prevent the spool 300 from moving. In alternative embodiments using friction instead of locking teeth 322a–b, the annular boss 318 and clutch member 314 may be designed to allow partial engagement between mating teeth 110 and drive teeth 118 while clutch member 314 is still in contact with the capped end 210 of post 202. In this situation, the aligning force of the mating teeth 110 and drive teeth 118 overcome the static friction between the clutch member 314 and capped end 210 of post 202.

Another element of the preferred embodiment shown in FIG. 3 is the housing, which is fabricated as two clam shell halves 324 and 326 for ease of assembly. In the normal orientation, baseplate 112 is connected to the top shell 324 with all of the spools 300 below the baseplate 112. The bottom shell 326 encloses the baseplate 112 and all of the spools 300. Bottom shell 326 also has an opening 328 for each spool 300 through which the drive teeth 118 and annular boss 318 on driver coupler 116 engage the mating teeth 110 and clutch member 314 respectively of spool 300. Preferably, the mating teeth 110 of spool 300, the clutch member 314, and post. 202 are slightly recessed inside opening 328 or flush with the bottom surface 330 of tape cartridge 332 for their protection.

Other housing styles and arrangements may be used within the scope of the present invention. For example, the baseplate 112 and top shell 324 may be a single element serving both purposes. In this embodiment, the presence of the second bearing race 312 allows the combined baseplate 112/top shell 324 to be made of a plastic material. In another example, the top shell 324 and bottom shell 326 may be fabricated as a single molded housing.

FIG. 4 is a flow diagram of the process for engaging tape cartridge 332 to the fixed center drive 102. The process is written in terms of one spool 300 and one fixed center drive 102. The process is the same for each spool 300 and the respective fixed center drive 102 for a multi-spool tape cartridge. Initially, tape cartridge 332 and fixed center drive 102 are coarsely aligned, as indicated in block 400. Next, the relative z axis spacing between the tape cartridge 332 and fixed center drive 102 is decreased causing the annual boss 318 to contact the clutch member 314, as indicated by block 402. The relative z axis spacing may be decreased by moving tape cartridge 332 toward fixed center drive 102, moving fixed center drive 102 toward tape cartridge 332, moving both, or moving the drive coupler 116 while leaving the drive mechanism stationary. As tape cartridge 332 and fixed center drive 102 continue to move toward each other, the clutch member 314 is displaced from the capped end 210 of post 202 unlocking the spool 300, as indicated in block 404. The spool 300 is now free to rotate and move in the x-y plane. In block 406, the mating teeth 110 of spool 300 and drive teeth 118 of drive coupler 116 first engage. As the mating teeth 110 and drive teeth 118 become further engaged, spool 300 is forced to move transversely in the x-y plane and rotated as necessary to aligned with the axis of rotation (the z axis) of the fixed center drive 102, as shown in block 408. After mating teeth 110 and drive teeth 118 are fully engaged, the flexible joint 120 flexes in a direction parallel to the z axis as spool 300 and drive mechanism 114 continue to move toward a predetermined final position. Flexible joint 120 biases the drive teeth 118 against the mating teeth 110. This helps prevent the drive teeth 118 and mating teeth 110 from ratcheting apart while transferring torque. The biasing force created by the flexible joint 120 is also passed through the annular boss 318, through clutch member 314, through the resilient member 316, and through the body 334 of the spool 300 to maintain the pre-loading on the bearings 302a–b, the first bearing race 310, and the second bearing race 312.

FIG. 5 is a flow diagram of the process for disengaging tape cartridge 332 from the fixed center drive 102. First, the relative z axis distance between tape cartridge 332 and the drive mechanism 114 is increased causing the flexible joint 120 to relax, as indicated by block 500. The spacing may be changed by moving the tape cartridge 332 away from the drive 102, moving the drive 102 away from the tape cartridge 332, or both. After the flexible joint 120 is returned to its normal non-flexed position, the drive teeth 118 of drive coupler 116 and mating teeth 110 of spool 300 disengage, as shown in block 502. As the separation continues, clutch member 314 locks against the capped end 210 of post 20 locking the spool 300, as shown in block 504. Finally, tape cartridge 332 separates from drive 102 as the annular boss 318 disengages from the clutch member 314, as shown in block 506.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape cartridge comprising:
   a baseplate having a planar surface;
   at least one spool having drive teeth and an axial bore, the axial bore having an internal diameter; and
   a post associated with each spool of the at least one spool, the post having a body, a mounting end attached to the baseplate, and a capped end, the post being disposed in the axial bore of the spool, the body of each post further having an outer diameter smaller than the internal diameter of the axial bore of the spool allowing the spool to move in a direction parallel to the planar surface of the baseplate, and wherein the capped end of each post maintains the spool proximate the baseplate.

2. The tape cartridge of claim 1 further comprising a plurality of bearings associated with each spool of the at least one spool, the plurality of bearings being disposed between the baseplate and the spool.

3. The tape cartridge of claim 2 further comprising a first bearing race associated with each spool of the at least one spool, the first bearing race being disposed between the spool and the plurality of bearings.

4. The tape cartridge of claim 2 further comprising a second bearing race associated with each spool of the at least one spool, each second bearing race being disposed between the plurality of bearings and the baseplate.

5. The tape cartridge of claim 1 wherein each spool of the at least one spool further has an axis of rotation, the tape cartridge further comprising:

a clutch member associated with each spool of the at least one spool, the clutch member being disposed between the spool and the capped end of the post, rotatably coupled to the spool, and operative to slide in the direction of the axis of rotation of the spool; and a resilient member associated with each spool of the at least one spool, each resilient member being disposed between the clutch member and the spool and biasing the clutch member against the capped end of the post.

6. The tape cartridge of claim 5 further comprising a plurality of locking teeth disposed on the capped end of each post and on each clutch member.

7. The tape cartridge of claim 1 further comprising a housing surrounding the baseplate, the at least one spool, and the respective post, the housing having an opening associated with each spool of the at least one spool.

8. A tape cartridge-drive system comprising:

at least one drive mechanism providing a driving torque about an axis of rotation;

a spool associated with each drive mechanism of the at least one drive mechanism, the spool having mating teeth and freedom to move in a plane approximately normal to the axis of rotation of the drive mechanism;

a drive coupler associated with each drive mechanism of the at least one drive mechanism, the drive coupler having drive teeth engageable with the mating teeth of the spool and the axis of rotation; and a flexible joint associated with each drive mechanism of the at least one drive mechanism, the flexible joint transferring torque between the drive coupler and the drive mechanism, and biasing the drive coupler towards the spool to maintain the drive teeth of the drive coupler biased against the mating teeth of the spool, wherein engaging the drive teeth of the drive coupler with the mating teeth of the spool centers the spool on the axis of rotation of the drive coupler.

9. The tape cartridge-drive system of claim 8 wherein each spool further has an axial bore, the system further comprising:

a baseplate having a planar surface approximately normal to the axis of the at least one drive mechanism; and a post associated with each spool, the post having a body, a mounting end attached to the baseplate, and a capped end, the post being disposed in the axial bore of the spool, the body of each post further having an outer diameter smaller than an internal diameter of the axial bore of the spool allowing the spool to move in a direction parallel to the planar surface of the baseplate, and wherein the capped end of the post maintains the spool proximate the baseplate.

10. The tape cartridge-drive system of claim 9 further comprising a plurality of bearings associated with each spool, the plurality of bearings being disposed between the baseplate and the spool.

11. The tape cartridge-drive system of claim 10 further comprising a first bearing race associated with each spool, the first bearing race being disposed between the spool and the plurality of bearings.

12. The tape cartridge-drive system of claim 10 further comprising a second bearing race associated with each spool, the second bearing race being disposed between the plurality of bearings and the baseplate.

13. The tape cartridge-drive system of claim 8 wherein each spool has an axis of rotation, the tape cartridge-drive system further comprising:

a clutch member associated with each spool, the clutch member being disposed between the spool and the capped end of the post, rotatably coupled to the spool, and operative to slide in a direction parallel to the axis of rotation of the spool;

a resilient member associated with each spool, the resilient member being disposed between the clutch member and the spool biasing the clutch member against the capped end of the post to couple the spool to the post; and a boss associated with each drive coupler, the boss being attached to the drive coupler, the boss being engageable with the clutch member decoupling the spool from the post.

14. The tape cartridge-drive system of claim 13 further comprising a plurality of locking teeth disposed on the capped end of each post and on each clutch member to couple each post to the respective clutch member when engaged.

15. The tape cartridge-drive system of claim 8 further comprising a housing surrounding each spool, the housing having an opening associated with each spool for allowing engagement of each spool with the respective drive coupler.

16. The tape cartridge-drive system of claim 8 wherein the flexible joint is a bellows type flexible joint.

17. A method for centering a spool mounted on a baseplate with an axis of rotation of a drive, the method comprising:

biasing the drive and the spool toward each other in a direction parallel to the axis of rotation of the drive to engage the drive with the spool;

unlocking the spool with respect to the baseplate in response to an initial engagement of the drive and the spool; and displacing the axis of rotation of the spool in a direction toward the axis of rotation of the drive in a plane approximately normal to the axis of rotation of the drive subsequent to unlocking the spool to center the spool on the axis of rotation of the drive.

18. The method of claim 17 further comprising locking the spool with respect to the baseplate in response to disengaging the spool from the drive.

* * * * *